United States Patent [19]

Horn, Jr.

[11] 4,178,281

[45] Dec. 11, 1979

[54] FLAME-RETARDANT POLYCARBONATE COMPOSITIONS

[75] Inventor: William E. Horn, Jr., Vincent, Ohio

[73] Assignee: Borg-Warner Corporation, Chicago, Ill.

[21] Appl. No.: 910,258

[22] Filed: May 30, 1978

[51] Int. Cl.² .......................... C08K 5/02; C08K 5/06; C08K 5/52; C08K 5/53

[52] U.S. Cl. .................. 260/45.8 R; 260/45.7 RL; 260/45.95 G; 525/2

[58] Field of Search ... 260/45.8 R, 45.95 G (U.S. only)

[56] References Cited

U.S. PATENT DOCUMENTS

| | | | |
|---|---|---|---|
| 3,090,799 | 5/1963 | Wahl et al. | 260/45.8 R |
| 3,141,032 | 7/1964 | Friedman | 260/45.8 R |
| 3,257,337 | 6/1966 | Schoepfle et al. | 260/30.6 R |
| 3,557,053 | 1/1971 | Miller | 260/45.7 P |
| 3,781,388 | 12/1973 | Jenkner et al. | 260/45.7 P |
| 3,970,635 | 7/1976 | Lawton et al. | 260/45.8 R |
| 3,997,505 | 12/1976 | Albright | 260/45.8 R |
| 4,033,931 | 7/1977 | Anderson | 260/45.95 G |
| 4,049,626 | 9/1977 | Anderson | 260/45.95 G |

OTHER PUBLICATIONS

Hilado, Flammability Handbook for Plastics, 1969, pp. 82–86.

*Primary Examiner*—Howard E. Schain
*Assistant Examiner*—R. A. White
*Attorney, Agent, or Firm*—Joseph Shekleton

[57] ABSTRACT

Flame-retardant polycarbonate compositions containing a pentaerythritol diphosphonate or diphosphate. A halogenated organic compound having at least about 30% halogen may also be present.

13 Claims, No Drawings

FLAME-RETARDANT POLYCARBONATE COMPOSITIONS

This invention relates as indicated to flame-retardant compositions. More particularly, it relates to polymer compositions which have an increased degree of flame retardance because of the presence of certain phosphonate or phosphate compounds.

Polymers vary widely in their resistance to burning. Some, such as the polyolefins, polystyrene, polyalkyl acrylates and methacrylates, and the like, burn readily. Polytetrafluoroethylene, polyvinylidene chloride and polyvinyl chloride, on the other hand, have a rather high resistance to burning. It is highly desirable that, for certain applications, a polymer should have a high degree of flame retardance so that it will meet various building codes, or that it will meet safety standards imposed on the manufacture of toys, automotive applications, etc.

The treatment of those more flammable polymers to increase their resistance to burning is well known; such treatment in general has involved the incorporation in the polymer composition of substantial proportions of antimony trioxide, halogenated paraffins, halogenated hydrocarbons and low molecular weight phosphate esters. Ordinarily, though, the effective use of these and other additives has required their presence in such high concentrations as to adversely affect the desirable properties of the polymer. Thus, such desirable properties as hardness, clarity, strength, elasticity, etc., are diminished significantly by the presence of large amounts of a flame-retarding chemical.

The formulator's goal, in preparing a flame-retardant polymer composition, is to add just enough of the flame-retardant compound so as to provide the desired degree of flame retardance, but no more than this minimum amount, so as to preserve as much as possible the advantageous properties of the polymer. Frequently, it is not possible to select a flame retardant which will meet these requirements satisfactorily.

Polycarbonates may be rendered flame resistant by incorporating halogen in their molecular structure. Ordinarily, they are prepared by polymerizing a polyhydric phenol with a suitable carbonate precursor, but a polybromo-substituted polyhydric phenol may be substituted for a portion of the polyhydric phenol to give a product having flame-retardant properties. (See U.S. Pat. No. 3,334,154.) On the other hand, specific flame-retardant additives may be used to impart flame-retardant properties to the polycarbonates. These are, for the most part, halogen-containing additives, but a wide variety of halogen-free compounds have been suggested for this purpose. (See U.S. Pat. No. 3,751,400; German Offenlegungsschrift No. 25 56 739; U.S. Pat. Nos. 3,382,207; 3,786,114; and 3,809,676.)

This invention is an aromatic polycarbonate containing a minor proportion of a phosphorus compound having the structural formula:

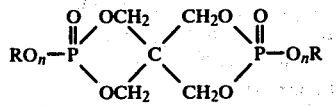

wherein R is alkyl of 1-8 carbon atoms or aryl of 6-20 carbon atoms, and n is 0 or 1.

The aromatic polycarbonate is a polyester of a polyhydric phenol and a carbonate precursor. Preferably, the polyhydric phenol is a dihydric phenol and, still more preferably, it is bisphenol A, i.e., 4,4'-isopropylidene diphenol. Other polyhydric phenols which are contemplated include 2,4'-isopropylidene diphenol, 2,2'-isopropylidene diphenol, 2-(3,4-dihydroxyphenyl)-2-(4-hydroxyphenyl)propane, hydroquinone, resorcinol, phloroglucinol, catechol, 4,4'-methylidene diphenol and the like. In general, the polyhydric phenols contain fewer than 20 carbon atoms.

The aromatic polycarbonate herein may be prepared from a mixture of dihydric phenols wherein one of the dihydric phenols contains one or more bromine substituents. A polybrominated bisphenol A mixed with bisphenol A, for example, may serve as a starting material for the preparation of a suitable polycarbonate.

It will be seen that the above phosphorus compounds are phosphonates or phosphates.

The alkyl groups of these phosphorus compounds are lower alkyl groups, i.e., of 1-8 carbon atoms. Methyl groups are preferred; ethyl, propyl, butyl, pentyl, hexyl, heptyl and octyl groups are also satisfactory. Ordinarily, the alkyl groups are alike, but dialkyl diphosphonates or diphosphates are also contemplated wherein the alkyl groups are dissimilar. Where R in the above formula is aryl, the aryl groups, which may be alike or dissimilar, may be phenyl, tolyl, xenyl, naphthyl, p-octylphenyl, 2,4-diamylphenyl, etc. Most usually it will be phenyl. The two R groups in the same molecule, when aromatic, may be the same or different.

The phosphorus flame-retardant additive may be a mixture of a phosphonate and a phosphate, or a mixture of different phosphonates or of different phosphates.

As taught by Friedman in his U.S. Pat. No. 3,141,032, the dialkyl pentaerythritol diphosphonates can be prepared by the Arbuzov rearrangement of the corresponding phosphites, i.e., dialkyl pentaerythritol diphosphite. The Arbuzov rearrangement is carried out by heating the diphosphite in the presence of an alkyl halide catalyst or an alkali or alkaline earth metal bromide or iodide catalyst. Typical metal halide catalysts include lithium bromide, lithium iodide, sodium bromide, sodium iodide, potassium iodide, potassium bromide, magnesium iodide, magnesium bromide, calcium bromide, calcium iodide, barium bromide, barium iodide, strontium bromide and strontium iodide. When an alkyl halide is used as the catalyst, it is preferred to use one in which the alkyl group is the same as that of the dialkyl pentaerythritol diphosphite.

The diaryl pentaerythritol diphosphites may be prepared from the corresponding aryl dichlorophosphines by reaction with pentaerythritol followed by oxidation.

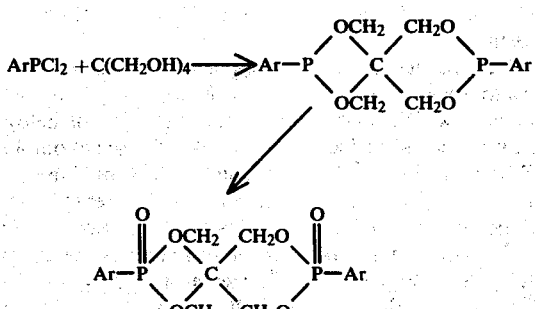

Relatively high temperatures are required inasmuch as the dialkyl pentaerythritol diphosphites are much less susceptible to rearrangement than are the simple trialkyl phosphites. Generally, temperatures within the range of from about 130° C. to about 225° C. are suitable. When the low molecular weight, relatively volatile diphosphites are used, it may be necessary to carry out the reactions in a sealed vessel, i.e., at superatmospheric pressure, so as to maintain such high temperatures.

The pentaerythritol diphosphates may be prepared by reaction of pentaerythritol with phosphorus oxychloride, according to the following equation:

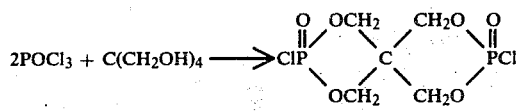

followed by the reaction of the above intermediate product with an alcohol or phenol, depending on the phosphorus additive desired. That reaction is illustrated by the equation:

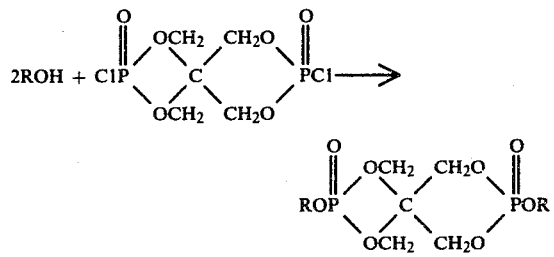

where R is alkyl or aryl.

Alloys of aromatic polycarbonates and ABS resins are useful in many applications. They exhibit toughness and high heat resistance. A good balance of rigidity, strength, heat resistance and processability can be achieved at a relatively low price. They are useful in the preparation of thermoformed sheet and in injection molding applications that require ductility at temperatures as low as −60° F.

These alloys, like the polycarbonates themselves, frequently find use in environments where flame-retardant properties are desirable or even imperative. The phosphonate additives herein are effective to provide this property to these alloys, also. In most of these instances, however, it is desirable to use these phosphonates in combination with halogenated organic compounds wherein the halogen content is at least about 30%.

The polycarbonate-ABS resin alloys contemplated herein include those having up to 75% of ABS resin. Illustrative examples include 95:5, 80:20, 75:25, 60:40, 50—50, 40–60 and 25–75 ratios of polycarbonate: ABS resin.

The halogenated organic compound may, as indicated, be any such compound or mixture of such compounds which contains at least about 30% of halogen. In most cases the halogen content is at least about 45%. While the halogen may be any of the halogens, i.e., fluorine, chlorine, bromine and iodine, generally it is either chlorine or bromine. Halogenated organic compounds containing both chlorine and bromine are useful. The halogen may be either aromatic halogen, i.e., where the halogen atom is bound directly to an aromatic ring, or it may be aliphatic halogen.

Illustrative species of suitable halogenated organic compounds include brominated adducts of a polyhalocyclopentadiene and a polyunsaturated compound, as disclosed more particularly in U.S. Pat. No. 3,794,614 (Versnel); adducts of two mols of a polyhalocyclopentadiene and one mol of a polyunsaturated compound; and polyhalogenated ethers. Other suitable halogenated organic compounds include polymeric materials like poly(vinylchloride), poly(vinylidene chloride), copolymers of vinyl chloride and vinylidene chloride, etc. Additional illustrative species are disclosed in U.S. Pat. No. 3,915,930 (Dotson et al.); U.S. Pat. No. 3,922,316 (Versnel); U.S. Pat. No. 3,915,932 (Wolford et al.); U.S. Pat. No. 3,899,463 (Newcombe); U.S. Pat. No. 3,894,988 (Anderson et al.); U.S. Pat. No. 3,894,987 (Anderson); U.S. Pat. No. 3,892,710 (Anderson et al.); U.S. Pat. No. 3,891,599 (Marciniak et al.); U.S. Pat. No. 3,878,165 (Anderson); U.S. Pat. No. 3,876,612 (Anderson et al.); U.S. Pat. No. 3,830,779 (Anderson); U.S. Pat. No. 3,810,867 (Anderson); U.S. Pat. No. 3,810,666 (Anderson); U.S. Pat. No. 3,786,023 (Dotson et al.); U.S. Pat. No. 3,761,443 (Newcombe); U.S. Pat. No. 3,714,274 (Rosenberg); U.S. Pat. No. 3,687,983 (Dever et al.); U.S. Pat. No. 3,392,136 (Hindersinn et al.); U.K. Pat. No. 1,090,814; German No. 2,328,535; German No. 2,328,520; German No. 2,328,517; and Canadian No. 919,856.

The above flame-retardant compounds should be added to the aromatic polycarbonate compositions herein in amounts sufficient to give the desired degree of flame retardation. The amount required to give a desirable flame-retardant polymer varies somewhat depending upon the particular polymer, the shape of the polymer in its final form and the degree of flame retardation desired. The compositions herein contain a flame-retarding amount of the additives. By "flame-retarding amount" is meant that amount which when present in the polymer measurably reduces the tendency of the polymer to burn. They may contain up to about 50% of such additives. In the preferred compositions the additives will comprise from about 1 to about 30% of the composition. In most instances, because of the relative cost and effectiveness, the compositions will contain from about 2 to about 25% of the additives.

The amount of pentaerythritol diphosphonate or diphosphate to be used in the polycarbonate compositions herein ranges from about 1% to about 20%. Less than this minimum quantity is ineffective to impart satisfactory flame-retardant properties and more than the maximum quantity is unnecessary. When the use of a halogenated organic compound is indicated, as, for example, in the case of alloys of polycarbonates and ABS resins, up to 30% may be used. Generally, it is unnecessary to use more than 20% of a halogenated organic compound, in combination with the phosphonate or phosphate, to achieve satisfactory flame-retardant properties.

Preparation of the flame-retardant compositions of this invention may be accomplished by mixing them in an electrically heated Brabender head for about 10 minutes at 200° C. and 60 rpm. Other compounding methods may, of course, be used. The test specimens for which data is shown in the tables are prepared from compression molded slabs.

The flame retardance of a plastic material can be determined by means of Underwriters Laboratories Test UL-94. The test specimen measures 5"×0.5"×0.125"; it is suspended vertically at a measured height above the flame from a Bunsen burner. After 10 seconds the flame is removed and the duration of the flaming of the test specimen is noted. Immediately, the flame is placed again under the specimen and after 10 seconds the flame again is withdrawn and the duration of flaming and glowing is noted. Five test specimens are thus tested and the results of all five tests are considered in the determination of a rating for the plastic material.

The following are noted: (1) duration of flaming after first flame application; (2) duration of flaming after second flame application; (3) duration of flaming plus glowing after second flame application; (4) whether or not specimens burn up to their point of suspension; and (5) whether or not specimens drip flaming particles which ignite a cotton swatch placed 12 inches beneath the test specimen. The highest rating given to a material is "V-0". It indicates that (1) no specimen burns with flaming combustion for more than 10 seconds after each application of the test flame; (2) the material does not have a flaming combustion time exceeding 50 seconds for the 10 flame applications for each set of 5 specimens; (3) no specimen burns with flaming or glowing combustion up to the holding clamp; (4) no specimen drips flaming particles that ignite the dry cotton beneath the specimen; and (5) no specimen glows for more than 30 seconds after the second removal of the flame.

The next highest rating is "V-1". It indicates that (1) no specimen burns with flaming combustion for more than 30 seconds after each application of the test flame; (2) the material does not have a flaming combustion time exceeding 250 seconds for the 10 flame applications for each set of 5 specimens; (3) no specimen burns with flaming or glowing combustion up to the holding clamp; (4) no specimen drips flaming particles that ignite the dry surgical cotton beneath the specimen; and (5) no specimen glows for more than 60 seconds after the second removal of the flame.

A "V-2" rating is given to a composition (1) when no specimen burns with flaming combustion for more than 30 seconds after each application of the test flame; (2) it does not have a total flaming combustion time exceeding 250 seconds for the 10 flame applications for each set of 5 specimens; (3) no specimen burns with flaming or glowing combustion up to the holding clamp; (4) some specimens drip flaming particles which burn only briefly, some of which ignite the dry cotton beneath the specimen; and (5) no specimen glows for more than 60 seconds after the second removal of the flame.

The lowest rating given to a material in this test is "NSE" ("non-self-extinguishing"). It indicates that the material has failed to meet one or more of the criteria for the UL-94 vertical test.

Another test for the flammability of a plastic material measures the minimum concentration of oxygen that will just support combustion. The test is an ASTM test, D 2863-70. It is carried out in a glass column wherein the concentration of oxygen is varied until that concentration is found which will just support the burning of a test specimen, for 3 minutes or until 50 mm of the specimen has burned. The test specimen is 70-150 mm long by 6.5 mm wide by 3.0 mm thick. This concentration of oxygen is called the oxygen index (OI). A high oxygen index indicates a highly flame-retardant specimen.

The effectiveness of the compositions herein in resisting flaming is shown by the data in Table I, where such effectiveness is shown (in polycarbonate, prepared by reaction of bisphenol A and phosgene) as a function with varying proportions of dimethyl pentaerythritol diphosphonate (DMPD).

TABLE I

| | Polycarbonate | DMPD[1] | UL-94 Test | ABT[2] | OI |
|---|---|---|---|---|---|
| 1. | 100 | 0 | NSE | — | 27.5 |
| 2. | 99 | 1 | V-2 | 12.5 | 28.5 |
| 3. | 98 | 2 | V-2 | 7.0 | 30.0 |
| 4. | 97 | 3 | V-2 | 9.0 | 30.5 |
| 5. | 96 | 4 | V-0 | 4.8 | 31.5 |
| 6. | 95 | 5 | V-1 | 5.7 | 28.5 |
| 7. | 94 | 6 | V-0 | 2.9 | 29.5 |
| 8. | 90 | 10 | V-0 | <1.0 | 33.0 |
| 9. | 80 | 20 | V-0 | <1.0 | 33.0 |

[1]DMPD is dimethyl pentaerythritol diphosphonate.
[2]ABT is average burning time (in seconds).

It will be noted, above, that as little as 4 parts of the phosphorus compound of this invention is sufficient to impart a high degree of flame retardance to the polycarbonate; moreover, even 1 part is sufficient to impart a significant flame retardance.

TABLE II

| | Polycarbonate | DPPD[3] | UL-94 Test | ABT | OI |
|---|---|---|---|---|---|
| 1. | 100 | 0 | NSE | — | 27.5 |
| 2. | 97 | 3 | V-2 | 4.0 | 33.0 |
| 3. | 95 | 5 | V-2 | 3.7 | 35.5 |
| 4. | 94 | 6 | V-2 | 7.8 | 32.0 |
| 5. | 92.5 | 7.5 | V-2 | 2.8 | 33.0 |
| 6. | 90 | 10 | V-2 | 1.2 | 34.0 |

[3]DPPD is diphenyl pentaerythritol diphosphonate.

The data in Table II shows the similar effectiveness of diphenyl pentaerythritol diphosphonate. Despite the V-2 ratings, the average burning times all are low. The V-2 ratings are the result of dripping flaming particles which ignite the cotton swatch below the test specimen.

TABLE III

| | Polycarbonate | DPPD[3] | UL-94 Test | ABT | OI |
|---|---|---|---|---|---|
| 1. | 100 | 0 | NSE | — | 27.5 |
| 2. | 97 | 3 | V-2 | 2.8 | 32.0 |
| 3. | 96 | 4 | V-2 | <1 | 32.0 |
| 4. | 95 | 5 | V-2 | <1 | 32.0 |
| 5. | 93 | 7 | V-2 | <1 | 32.0 |

[4]DMPDP is dimethyl pentaerythritol diphosphate.

The effectiveness of a phosphate additive of the invention is shown by the data in Table III.

The data of Table IV shows the flame-retardant properties of alloys of a polycarbonate and an ABS resin, where the alloys contain small proportions of dimethyl pentaerythritol diphosphonate or diphenyl pentaerythritol diphosphonate.

TABLE IV

| | Polycarbonate | ABS Resin | DMPD | DPPD | UL-94 Test | OI |
|---|---|---|---|---|---|---|
| 1. | 50 | 50 | — | — | NSE | 20.0 |
| 2. | 45 | 45 | 10 | — | NSE | 25.5 |
| 3.[5] | 42.5 | 42.5 | 15 | — | V-2 | 27 |
| 4.[5] | 41.25 | 41.25 | 17.5 | — | V-2 | 27.5 |
| 5.[5] | 40 | 40 | 20 | — | V-1 | 27.5 |
| 6. | 40 | 40 | 20 | — | V-0 | 26.5 |
| 7. | 40 | 40 | — | 20 | V-2 | 24 |

[5]contains 1% of polyethylene.

The effectiveness of a combination of the phosphorus compound of the invention and a halogenated organic compound is shown by the data in Table V, where the polycarbonate composition is an alloy of an aromatic polycarbonate and an ABS resin.

TABLE V

|    | Polycarbonate | ABS Resin[6] | DMPD  | $HOC_1$[7] | $HOC_2$[8] | ABT  | UL-94 Test | OI   |
|----|---------------|--------------|-------|------------|------------|------|------------|------|
| 1. | 45            | 45           | 7.5   | —          | 2.5        | 7.0  | V-2        | 25.5 |
| 2. | 45            | 45           | 6.7   | —          | 3.3        | 5.2  | V-2        | 25.5 |
| 3. | 45            | 45           | 5.0   | —          | 5.0        | 12.3 | V-2        | 25.5 |
| 4. | 42.5          | 42.5         | 11.25 | —          | 3.75       | 5.9  | V-2        | 27.0 |
| 5. | 42.5          | 42.5         | 10.0  | —          | 5.0        | 5.8  | V-2        | 27.5 |
| 6. | 42.5          | 42.5         | 7.5   | —          | 7.5        | 4.0  | V-0        | 27.0 |
| 7. | 42.5          | 42.5         | 5.0   | —          | 10.0       | 3.2  | V-0        | 28.0 |
| 8. | 42.5          | 42.5         | 3.75  | —          | 11.25      | 1.5  | V-0        | 27.5 |
| 9. | 42.5          | 42.5         | 11.25 | 3.75       | —          | —    | V-2        | 27.0 |
| 10.| 42.5          | 42.5         | 10.0  | 5.0        | —          | —    | V-2        | 27.0 |

[6]The ABS is prepared by copolymerizing styrene and acrylonitrile in the presence of polybutadiene.
[7]$HOC_1$ is 1,2-bis(2',4',6'-tribromophenoxy)ethane.
[8]$HOC_2$ is decabromodiphenyl ether.

The thermal stability of the phosphorus additives herein is shown by the high temperatures at which they begin to decompose, as illustrated in Table VI.

TABLE VI

| Additive | Onset of Decomposition |
|----------|------------------------|
| 1. Dimethyl pentaerythritol diphosphonate | 352° C. |
| 2. Diphenyl pentaerythritol diphosphonate | 385° C. |
| 3. Diphenyl pentaerythritol diphosphate   | 395° C. |

Table VII shows the relative non-volatility of these additives. This is an important property because of the very high temperatures, i.e., generally, higher than 275° C., at which polycarbonates are processed. The data shows the temperature at which 10% of the weight of a test sample has disappeared.

TABLE VII

| Additive | Temperature |
|----------|-------------|
| 1. Dimethyl pentaerythritol diphosphonate | 298° C. |
| 2. Diphenyl pentaerythritol diphosphonate | 378° C. |
| 3. Diphenyl pentaerythritol diphosphate   | 383° C. |

All parts and percentages herein are by weight unless otherwise clearly expressed.

I claim:

1. An aromatic polycarbonate composition containing a minor proportion of at least one phosphorus compound having the structural formula:

$$RO_n-P(=O)(OCH_2)_2C(CH_2O)_2P(=O)-O_nR$$

wherein R is alkyl of 1-8 carbon atoms or aryl of 6-20 carbon atoms and n is 0 or 1.

2. The aromatic polycarbonate composition of claim 1 wherein n is 0.

3. The aromatic polycarbonate composition of claim 1 wherein n is 1.

4. The aromatic polycarbonate composition of claim 1 wherein R is methyl.

5. The aromatic polycarbonate composition of claim 1 wherein R is phenyl.

6. The aromatic polycarbonate composition of claim 1 wherein the aromatic polycarbonate is an aromatic polycarbonate of a dihydric phenol and a carbonate precursor.

7. The aromatic polycarbonate composition of claim 1 wherein the aromatic polycarbonate is a carbonic acid polyester of an alkylidenediphenol.

8. An aromatic polycarbonate composition containing minor proportions of each of (a) a phosphorus compound having the structural formula:

$$RO_n-P(=O)(OCH_2)_2C(CH_2O)_2P(=O)-O_nR$$

where R is alkyl of 1-8 carbon atoms or aryl of 6-20 carbon atoms and n is 0 or 1, and (b) a halogenated organic compound containing at least about 30% of halogen.

9. The aromatic polycarbonate composition of claim 8 wherein the halogenated organic compound contains at least about 50% of halogen.

10. The aromatic polycarbonate composition of claim 8 wherein the halogenated organic compound is a chlorinated and/or brominated compound.

11. The aromatic polycarbonate composition of claim 8 wherein R is methyl or phenyl.

12. The aromatic polycarbonate composition of claim 1 wherein the aromatic polycarbonate is a polycarbonate of a mixture of polyhydric phenols.

13. The aromatic polycarbonate composition of claim 1 wherein two or more such phosphorus compounds are present.

* * * * *